(12) United States Patent
Carson et al.

(10) Patent No.: US 6,547,057 B1
(45) Date of Patent: Apr. 15, 2003

(54) APPARATUS AND PROCESS FOR HANDLING CIRCULAR ARTICLES

(75) Inventors: David E. Carson, Fort Collins, CO (US); Kevin J. Anzek, Fort Collins, CO (US); Thomas A. Sahrle, Fort Collins, CO (US); Dennis E. Schneider, Fort Collins, CO (US)

(73) Assignee: CBW Automation, Inc., Fort Collins, CO (US)

( * ) Notice: Subject to any disclaimer, the term of this patent is extended or adjusted under 35 U.S.C. 154(b) by 0 days.

(21) Appl. No.: 09/589,709

(22) Filed: Jun. 5, 2000

(51) Int. Cl.[7] .............................................. B65G 47/24
(52) U.S. Cl. ...................... 198/408; 198/412; 193/10; 414/798.4; 414/755
(58) Field of Search .................... 198/493, 443, 198/397.03, 397.04, 397.05, 392, 377.04, 377.08, 380, 408, 412; 414/798.4, 755, 757, 802, 901; 193/10

(56) References Cited

U.S. PATENT DOCUMENTS

| | | | | |
|---|---|---|---|---|
| 2,534,362 A | * | 12/1950 | Magnuson | 198/399 |
| 2,555,908 A | * | 6/1951 | Edeskuty et al. | 127/25 |
| 3,235,060 A | * | 2/1966 | Camberini | 198/408 |
| 3,341,031 A | * | 9/1967 | Myers | 193/44 |
| 3,497,086 A | * | 2/1970 | Adams et al. | 221/12 |
| 3,682,292 A | | 8/1972 | Drew | 198/33 AD |
| 3,741,366 A | * | 6/1973 | Van Melle et al. | 198/400 |
| 3,878,945 A | * | 4/1975 | Mojden et al. | 235/98 C |
| 4,098,392 A | * | 7/1978 | Greene | 198/419.3 |
| 4,274,531 A | * | 6/1981 | Whitmore | 198/397.03 |
| 4,611,705 A | * | 9/1986 | Fluck | 198/419.3 |
| 4,927,319 A | * | 5/1990 | Montail | 414/788.4 |
| 4,984,678 A | * | 1/1991 | Fauchard | 198/443 |
| 5,005,340 A | * | 4/1991 | Mojden | 377/6 |
| 5,020,655 A | * | 6/1991 | Cruver | 198/419.1 |
| 5,042,639 A | * | 8/1991 | Guinn et al. | 198/415 |
| 5,095,684 A | * | 3/1992 | Walker et al. | 198/462.2 |
| 5,163,073 A | * | 11/1992 | Chasteen et al. | 377/28 |
| 5,234,313 A | * | 8/1993 | DelDuca | 414/798.4 |
| 5,353,914 A | * | 10/1994 | Stephen et al. | 198/392 |
| 5,385,186 A | * | 1/1995 | Head et al. | 144/242.1 |
| 5,427,224 A | * | 6/1995 | Suehara et al. | 198/396 |
| 5,472,076 A | * | 12/1995 | Sommer | 198/412 |
| 5,595,282 A | * | 1/1997 | Mokler | 198/689.1 |
| 5,765,676 A | * | 6/1998 | Kalm | 198/396 |
| 5,863,177 A | * | 1/1999 | Carson et al. | 198/392 |
| 6,182,814 B1 | * | 2/2001 | Koehler | 198/418.7 |

* cited by examiner

*Primary Examiner*—Donald P. Walsh
*Assistant Examiner*—Jeffrey Shapiro
(74) *Attorney, Agent, or Firm*—William E. Hein

(57) ABSTRACT

An apparatus and process for receiving a multiplicity of like circular articles, such as discs, rings, and lids, for example, presented in a known or random horizontal orientation, and for collecting them for subsequent conventional processing into a horizontal counted stack in which each of the circular articles of the stack has the same on-edge or vertical orientation.

24 Claims, 4 Drawing Sheets

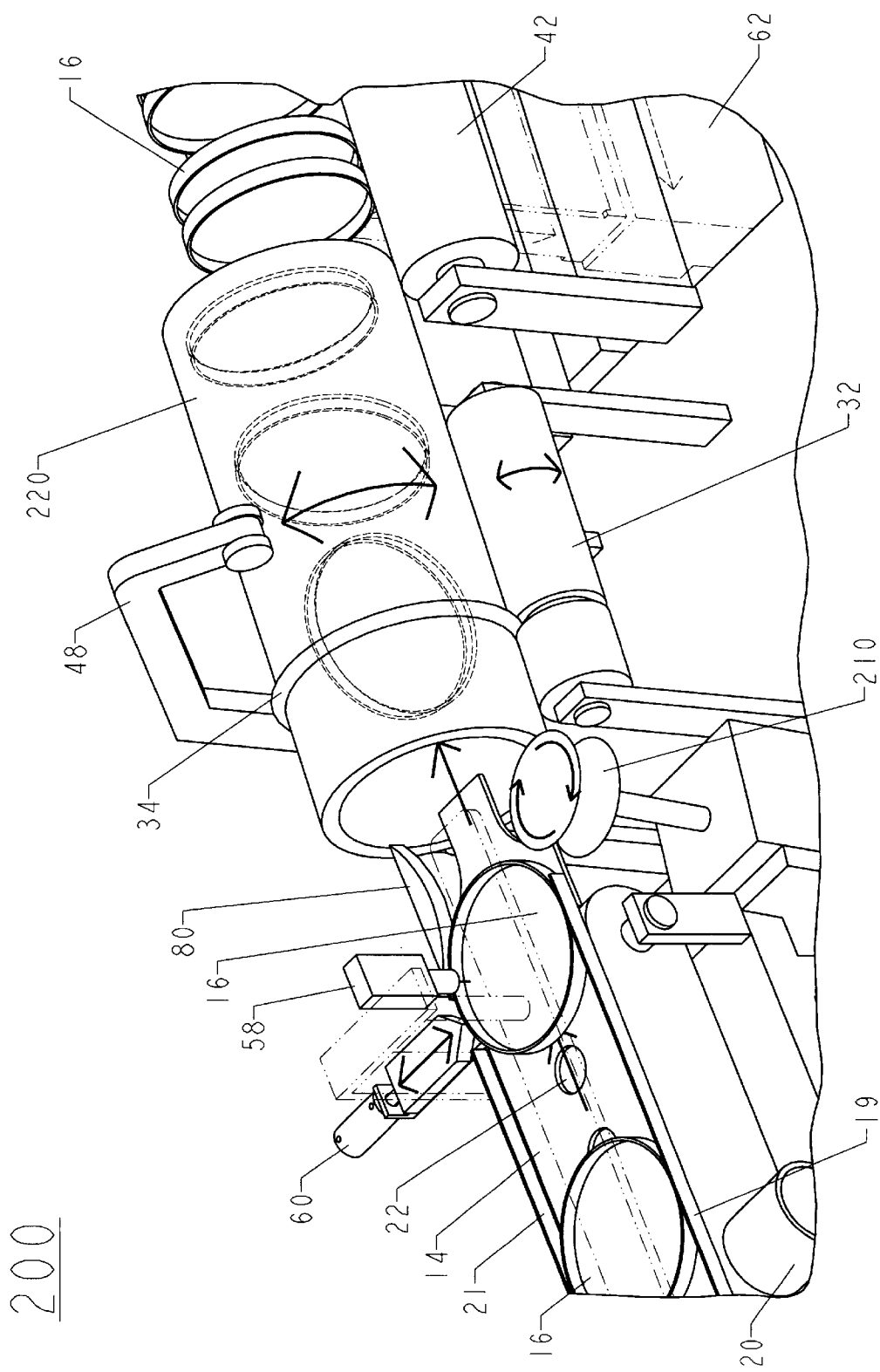

APPARATUS AND PROCESS FOR HANDLING CIRCULAR ARTICLES

BACKGROUND OF THE INVENTION

This invention relates to automated apparatus for handling like circular articles, such as discs, rings, and lids, for example. More particularly, the present invention is directed to such an apparatus that is capable of receiving a multiplicity of such articles in a known or unknown orientation and processing them into a counted stack of articles, all having the same known orientation, ready for further manual or automated handling.

In order to remain competitive, many companies seek to simplify various aspects of their manufacturing processes through automation. This is particularly true of companies involved in bulk manufacturing, such as injection molding and printing, in which each step of a process may yield a number of circular articles that are generally flat in cross section. Often, the rate at which such articles can be produced is limited only by how fast they can be removed, collected or dispersed. In view of this challenge, automators have concentrated on fewer, more reliable process steps.

Previous automated processes for orienting articles such as lids have employed various techniques with differing degrees of success. The early prior art for handling lids or other articles used a simple accept/reject technique, in which improperly oriented articles were returned to a holding area proximate the input of the handling apparatus in the hope that the improperly oriented articles would become correctly oriented as the result of being randomly disturbed and processed again. In a high speed production process, this technique impedes the throughput and adds unecessary process steps.

Another prior art orientation technique employs a constant airflow sufficient to reorient incorrectly oriented articles, while not disturbing the correctly oriented articles. Obviously, the strength of an indiscriminate airflow is very important to ensure that only incorrectly oriented articles are reoriented. This process is also undesirable in the case of some flat articles that may be susceptible to being reoriented, regardless of whether they are properly or improperly initially oriented.

The more recent prior art processes involve more active control of the orientation of flat articles through the controlled use of airflow to orient the article based on a signal from a sensor capable of determining the present orientation of the article. These prior art systems are deficient in that they lack mechanical interaction with the flat article. By relying on the timing of a burst of air, these systems struggle to achieve the orientation accuracy required for later automation at the rates of current manufacturing and printing processes.

Prior attempts to create counted collections of generally flat articles have also proven to be inadequate. One such prior art technique involves the use of two horizontal bars positioned for rotation in the same direction to thereby impart a rotational force on the peripheral edge of the article so as to provide a stabilizing gyroscopic effect permitting the collection and maintenance of a rotating horizontal stack of the articles. The challenge associated with this technique is one of repositioning articles that are supplied in a generally horizontal position into a vertical position, taking into account the difference between the rotational speed of the article and that of the rotating bars. Prior art methods for repositioning flat articles from a horizontal position to a vertical position have either involved excessive floor space or complex mechanisms. Also, the physical and kinematic differences in the rotational speeds of the flat article relative to the rotating bars can result in erratic behavior of the article and lost production.

The foregoing deficiencies of prior art flat article orientation and collection techniques have prevented the successful counting of those articles, and have left the user to estimate the number of such articles in a stack, based upon the measured length of the stack. The impediments to accurate counting of collected flat articles are variations in their thickness, the inability to consistently closely pack the articles, and the invasive nature of apparatuses for separating a rotating collection thereof at the required length. These factors directly affect the length of a stack containing the required number of articles and frustrate automated or manual packing techniques for quickly determining the required number of articles, based upon a static measurement of stack length. Nevertheless, automated attempts at counting the number of flat articles in a stack are known in the prior art. One such apparatus involves the application of a lateral force along the length of the required number of articles to thereby separate them from articles that are subsequently collected. Another prior art counting apparatus attempts to insert a thin wheel into a seam between adjacent articles of a rotating stack thereof. Both of these prior art apparatuses cause disruption to the rotating stacks, oftentimes resulting in dropped articles that are lost to production.

Exemplary of prior art lid handling apparatus is that described in U.S. Pat. No. 3,682,292 to Drew.

SUMMARY OF THE INVENTION

The present invention is directed to an apparatus for receiving a multiplicity of like circular articles, such as discs, rings, and lids, for example, presented in a known or random horizontal orientation, and for collecting them into a horizontal counted stack in which each of the circular articles of the stack has the same on-edge or vertical orientation. In the embodiment of the invention in which the multiplicity of circular articles are presented in random horizontal orientation, some right side up and some upside down, they are sequentially conveyed to a pair of rotating spinner wheels that contact diametrically opposing points along the periphery of each of the circular articles to impart rotation thereto in a selected direction and, by means of a speed differential between the two spinner wheels, to propel each article into a rotating first article orientation tube. The direction of rotation of the rotating spinner wheels are a function of the initial sensed orientation, either right side up or upside down, of each of the circular articles. The combination of the downstream force imparted by the spinner wheels and the slight frictional engagement between the peripheral edge of each of the circular articles and the inner surface of the first article orientation tube serves to slow the speed at which each of the circular articles is spinning and to thereby reorient them into an on-edge or vertical position as they travel through the first orientation tube. An optional, shorter second article orientation tube is axially aligned with the first article orientation tube proximate the downstream end thereof and is rotationally driven in the same direction as that of the first article orientation tube and at a speed selected to promote discharge of the spinning, vertically-oriented circular articles from the downstream end thereof, where they are received in that position onto a pair of rotating spin bars. The rotating circular articles received on the pair of rotating spin bars are collected into a counted horizontal stack of on-edge circular articles, at which time the stack is separated from a subsequent collecting stack in preparation for manual or automatic removal from the rotating spin bars for further processing.

In a second embodiment of the present invention, one of the spinner wheels is eliminated, and the second article orientation tube is also eliminated. This configuration may be utilized in situations in which all of the circular articles are initially presented in a common horizontal orientation, either all right side up or all upside down.

BRIEF DESCRIPTION OF THE DRAWINGS

FIG. 4 is a detailed pictorial diagram illustrating a portion of an apparatus for handling like circular articles, in accordance with a second embodiment of the present invention.

DETAILED DESCRIPTION OF THE PREFERRED EMBODIMENTS

Figure 1:
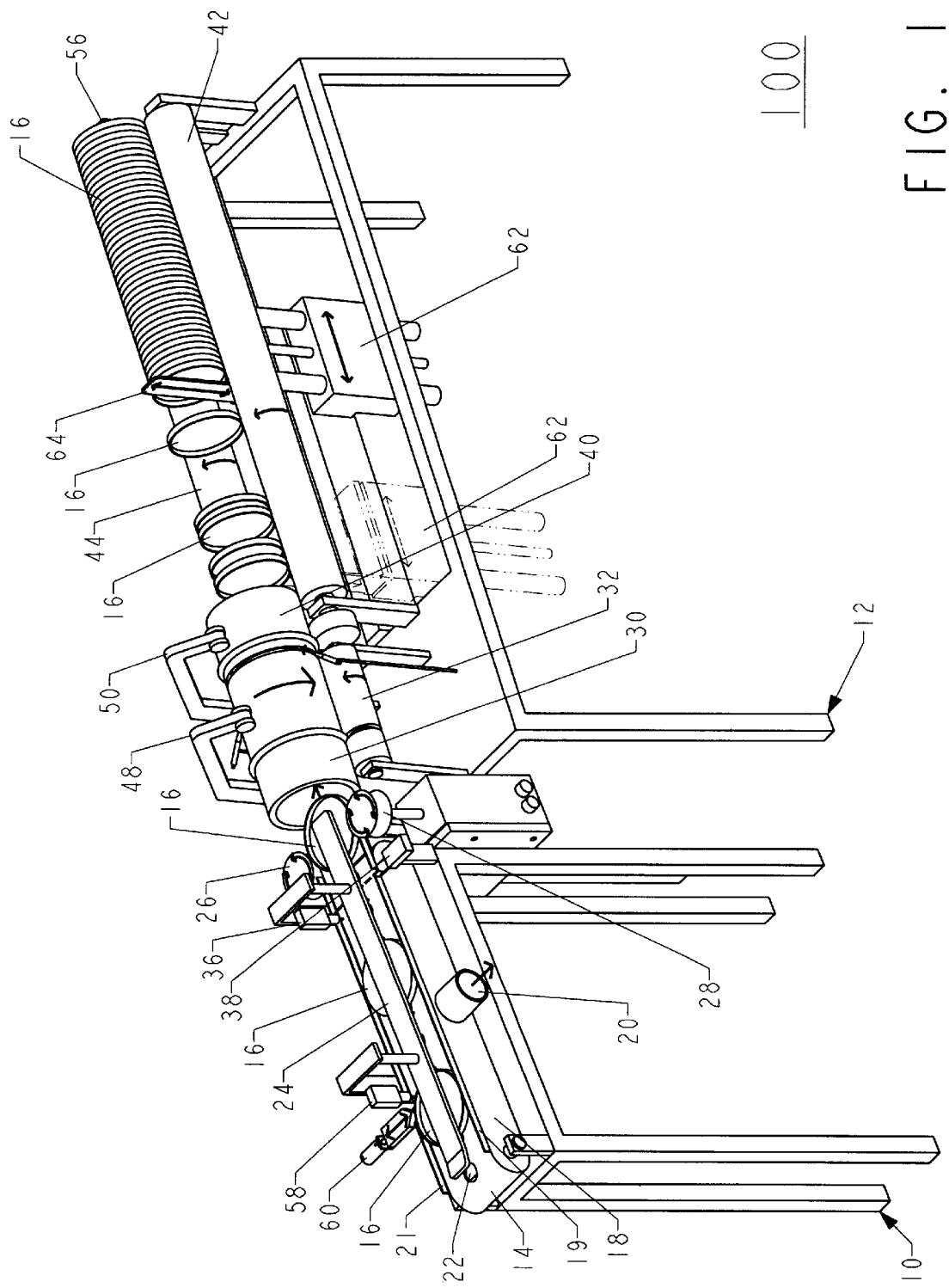
FIG. 1 is a pictorial diagram illustrating an apparatus for handling like circular articles, in accordance with a first embodiment of the present invention.
Figure 2:
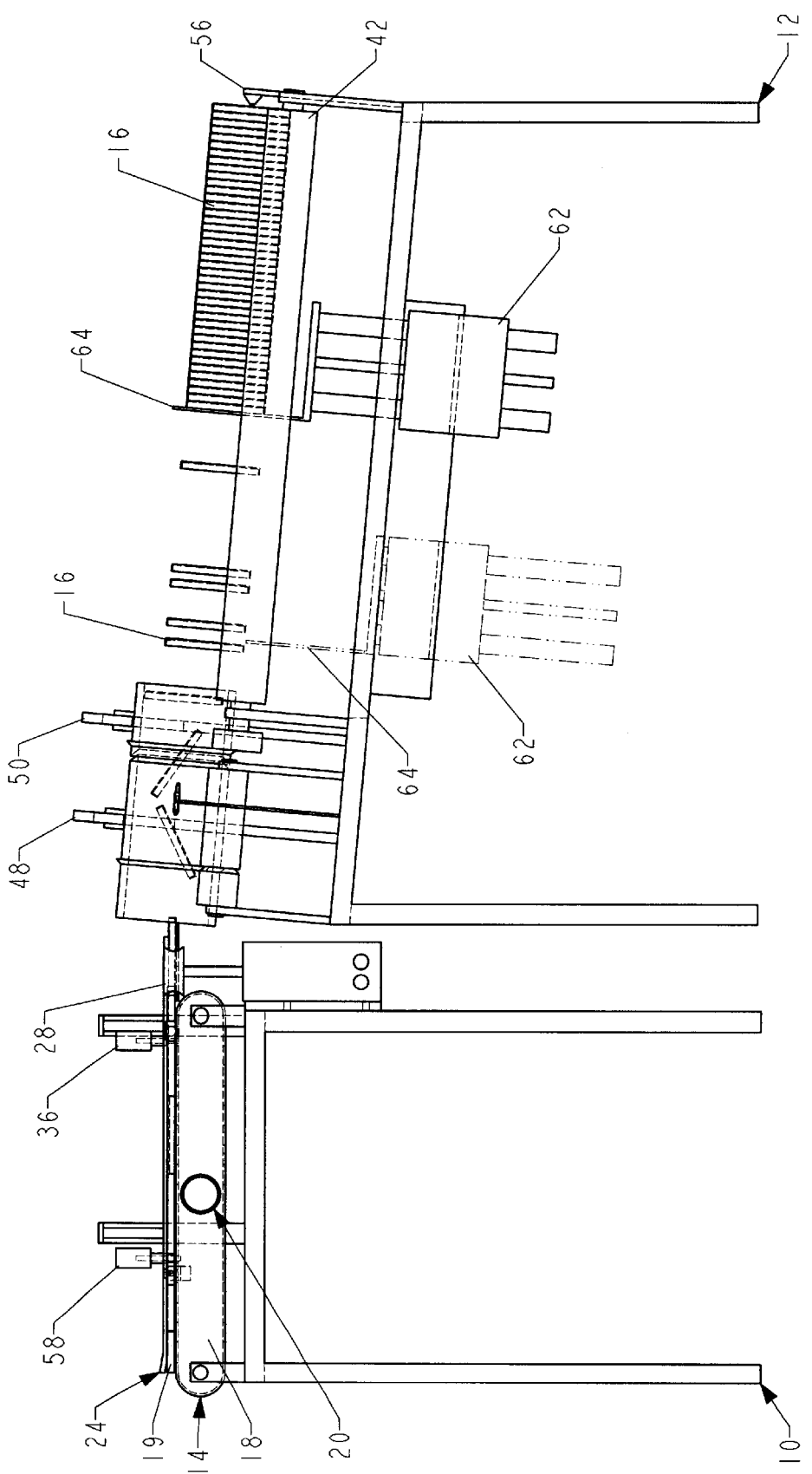
FIG. 2 is a front elevation view of the apparatus of FIG. 1.
Figure 3:
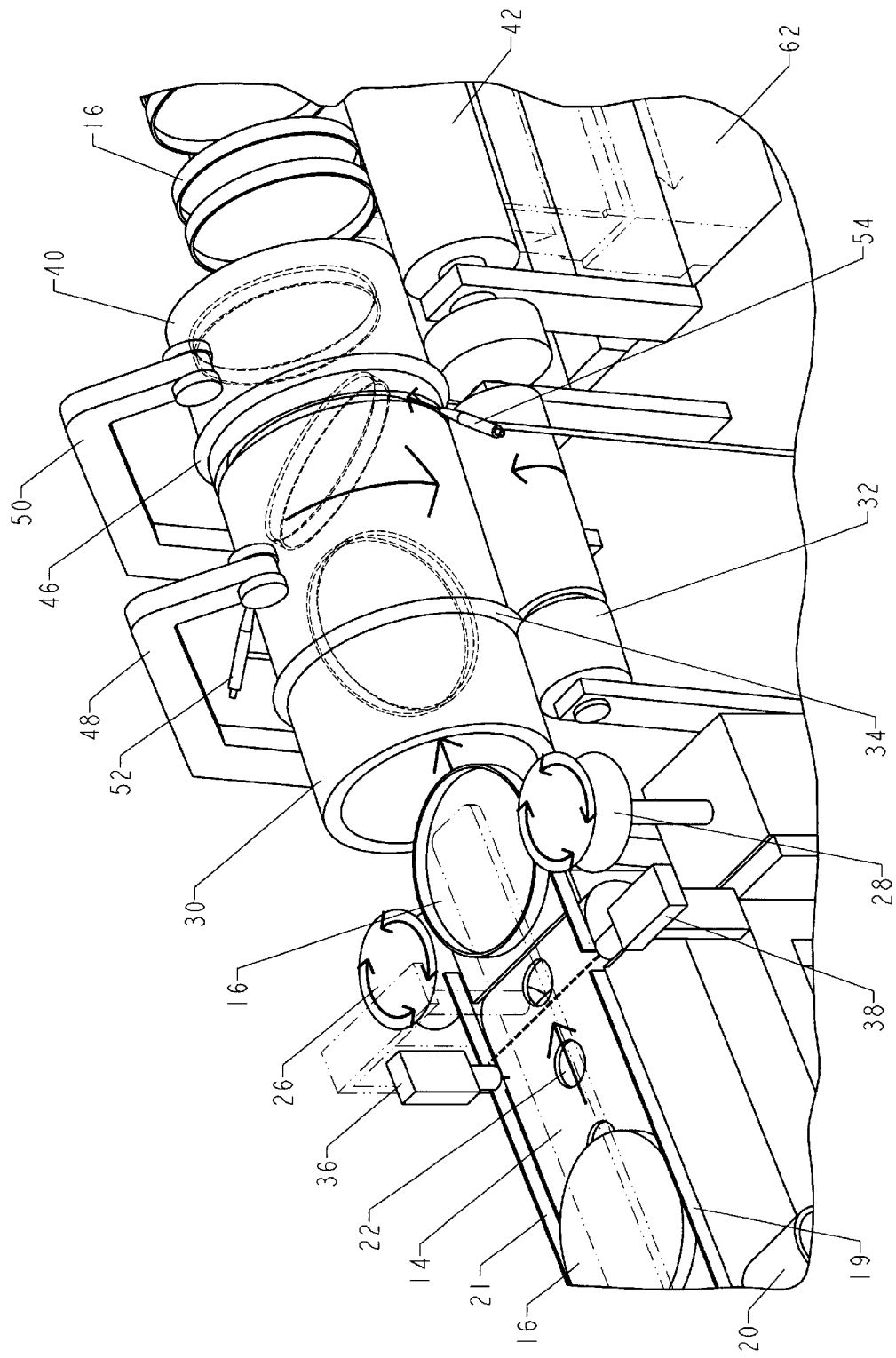
FIG. 3 is a detailed pictorial diagram illustrating a portion of the apparatus of FIGS. 1 and 2.

Referring now to FIGS. 1–3, there is shown a lid handling apparatus 100 supported by frame members 10 and 12. A conveyor belt 14 or other conventional means of conveyance is positioned to sequentially receive a multiplicity of circular articles 16 from a conventional external source. Circular articles 16 may be lids, discs, rings or any of a number of other such circular articles that are generally flat in cross section. A conveyor belt 14 is arranged for travel over a vacuum box 18 having a vacuum port 20 to which an external source of vacuum is coupled. Conveyor belt 14 includes a spaced plurality of longitudinally aligned vacuum openings 22 for contacting each of the articles 16 as they are received on conveyor belt 14 to insure that they are conveyed downstream at the speed of the conveyor belt 14. A pair of guides 19, 21 along the edges of conveyor belt 14 serve to align the articles 16 as they are being conveyed downstream. An upper guide member 24, fixedly mounted above conveyor belt 14, serves to further confine the articles 16 during conveyance.

A pair of reversible spinner wheels 26, 28, controlled by conventional motor control means, are positioned at the height of the conveyor belt 14 proximate the downstream end thereof to contact diametrically opposite points along the peripheral edge of the articles 16 as they exit the conveyor belt 14, to thereby impart rotation in a selected direction thereto, and, by providing a speed differential between spinner wheels 26, 28, to propel each article into a first article orientation tube 30 that is longitudinally aligned with conveyor belt 14, but arranged to slope slightly downwardly away from the downstream end thereof. Spinner wheels 26, 28 preferably have concave surfaces for contacting the peripheral edge of articles 16. An article position sensor 38 is mounted proximate the downstream end of the conveyor belt 14 to sense the presence of one of the articles 16 at that position. An article orientation sensor 36 is also mounted proximate the downstream end of the conveyor belt 14 to sense whether the one of articles 16 that is about to be contacted by the pair of spinner wheels 26, 28 is oriented right side up or upside down. If the articles 16 are flanged lids, for example, as illustrated in FIGS. 1–3, and the one of the articles 16 about to be contacted by the pair of spinner wheels 26, 28 is oriented flange up, also as illustrated in FIGS. 1–3, spinner wheels 26, 28 are preferably both driven to rotate counterclockwise, as viewed from above. If the article 16 is oriented flange down, as sensed by article orientation sensor 36, then spinner wheels 26, 28 are preferably reversed such that both are driven to rotate in the clockwise direction. However, it is possible to rotate just one of spinner wheels 26, 28, while the other is stopped. It is also possible to drive them in opposite directions of rotation. The important consideration is that the speed differential between spinner wheels 26, 28 be such as to propel each of articles 16 in the downstream or forward direction.

The force imparted to each of the articles 16 by spinner wheels 26, 28 serves to spin them into the article orientation tube 30, as illustrated in FIG. 3. Article orientation tube 30 is rotationally driven in the direction indicated in FIG. 3 by a driving roller 32 that engages a rib 34 on the outer surface of article orientation tube 30. However, any other conventional method of rotationally driving article orientation tube 30 may be employed. The combination of the downstream force imparted by spinner wheels 26, 28 and the slight frictional engagement between the peripheral edge of each of the articles 16 and the inner surface of the article orientation tube 30 to thereby slow the speed at which each of the articles 16 is spinning serves to reorient them into an on-edge or vertical position as they travel through orientation tube 30. The orientation of articles 16 within orientation tube 30, either flange forward or flange backward, may be changed by reversing the direction of rotation of orientation tube 30 or by reversing both the direction of rotation of spinner wheels 26, 28 and the speed differential therebetween to change the initial direction of rotation of articles 16 imparted by spinner wheels 26, 28. An optional, shorter second orientation tube 40 is axially aligned with orientation tube 30 proximate the downstream end thereof and is rotationally driven in the same direction as that of orientation tube 30 at a speed selected to promote discharge of the spinning, vertically-oriented articles 16 from the downstream end thereof, where they are received in that on-edge position onto a pair of rotating spin bars 42, 44. Alternatively, on-edge articles 16 may be received by any of a number of conventional devices other than rotating spin bars. Orientation tube 40 is rotationally driven from either of the spin bars 42, 44 by way of engagement with a rib 46 on the outer surface thereof, or by any other conventional driving mechanism. The flow of articles through orientation tubes 30, 40 may be optimized by varying the clearance distance between the diameter of articles 16 and the inner diameter of orientation tubes 30, 40, as well as by varying the coefficient of friction of the inner surface of those tubes. For example, the inner surface of orientation tube 30 may be partially or entirely coated with teflon, while the inner diameter of orientation tube 40 may be tapered by approximately 0.15 inches toward the downstream end thereof. The speed at which spin bars 42, 44 are driven is selected to be approximately the same as the rotational speed of the articles 16 as they exit orientation tube 40 to thereby provide a smooth transition of articles 16 onto spin bars 42, 44. Article orientation tubes 30, 40 are maintained in contact with their drive mechanisms by means of a pair of idler arms 48, 50, respectively. A pair of air jets 52, 54 receive compressed air from an external source and direct a flow of air in the downstream direction into a small gap between orientation tubes 30, 40 to promote the smooth flow of articles 16 through orientation tube 40.

After exiting orientation tube 40, articles 16 move downstream along spin bars 42, 44 on edge to form a collected horizontal stack of articles 16 against a conventional stop 56 at the far end thereof. In order to further process a collected stack of articles 16 on spin bars 42, 44, it is generally required that the number of articles 16 forming the collected stack be known. It is therefore necessary to count the number of articles 16 during collection of the stack and to provide some means of demarcation of a stack when a specified number of articles 16 have been collected. Accordingly, a counter photocell 58 or other conventional sensor is positioned along conveyor belt 14, which along with external conventional counter circuitry, serves to count each passing one of the articles 16. When a desired number of articles 16 has been counted, a counter stop 60, positioned along conveyor belt 14, is momentarily actuated to interrupt the flow of articles 16 entering conveyor belt 14. This has the effect of providing a space between the last one of the articles 16 required to form a collected stack of articles 16 of known number and the first one of the articles 16 forming the subsequent stack of articles 16 to be collected. A stack divider 62 is positioned below spin bars 42, 44 on tracks that permit it to be horizontally moved between the position shown by solid lines and that shown in phantom in FIGS. 1 and 2. As a stack of articles 16 is being collected on spin bars 42, 44, the stack divider 62 is in the position shown in phantom in FIGS. 1 and 2. When the required number of articles 16 has been collected, as indicated by the space between articles 16 introduced by counter stop 60, a stack divider arm 64 is raised upwardly from stack divider 62 into the space between articles 16 created by counter stop 60, and the stack divider is then moved downstream to its position illustrated by solid lines in FIGS. 1 and 2, thereby pushing the counted collected stack of articles 16 against the fixed stop 56 at the downstream end of spin bars 42, 44. The counted collected stack of articles 16 is then manually or automatically removed from the spin bars 42, 44 for further conventional processing, the stack divider arm 64 is retracted, and the stack divider 62 is moved to the position shown in phantom in FIGS. 1 and 2, awaiting the space between articles 16 that signals completion of the subsequent counted collected stack of articles 16.

While the speeds at which spinner wheels 26, 28 and orientation tubes 30, 40 rotate are matters of design choice to optimize performance of apparatus 100 when handling various types and sizes of articles 16, certain parameters have been selected in the case of handling common flanged lids having a diameter of approximately 4 9/16 inches. In that case, spinner wheel 26, having a diameter of 1 3/4 inches, rotates at approximately 1600 feet/minute, and spinner wheel 28, having the same diameter, rotates at approximately 778 feet/minute. Orientation tube 30, having an inside diameter of approximately five inches, rotates at approximately 400 feet/minute, while orientation tube 40, having the same diameter and separated from orientation tube 30 by a gap of approximately 0.100 inch, rotates at approximately 600 feet/minute.

Referring now to FIG. 4, there is shown a detailed view of a portion of a lid handling apparatus 200 constructed in accordance with an alternative embodiment of the present invention. The construction and operation of lid handling apparatus 200 is the same as described above in connection with lid handling apparatus 100 illustrated in FIGS. 1–3, except that it includes only one spinner wheel 210 and one article orientation tube 220 for handling articles 16. This alternative apparatus may be employed to handle articles 16 which are initially presented in the same orientation, either all right side up or all upside down. In this case, the single spinner wheel 210, rotating in the clockwise direction, urges each of the circular articles 16 against a guide member 80 that is fixedly positioned on the opposite side of conveyor belt 14 from spinner wheel 210, to thereby impart rotation to each of the articles 16 and to propel them into the single orientation tube 220. Alternatively, the positions of the single spinner wheel 210 and guide member 80 may be reversed. In that configuration, the direction of rotation of both spinner wheel 210 and that of orientation tube 220 would also be reversed. As stated hereinabove, the orientation of articles 16 by orientation tube 220 may be reversed by reversing the direction of rotation thereof.

We claim:

1. An apparatus for receiving, orienting, and collecting a multiplicity of like circular articles having a generally flat cross-section, such as discs, rings, and lids, the apparatus comprising:

a conveying device for sequentially conveying the multiplicity of circular articles, said multiplicity of circular articles being initially presented in a random horizontal orientation, some right side up and some upside down;

a pair of spinner wheels, mounted for rotation proximate a downstream end of the conveying device, for sequentially receiving each of the multiplicity of circular articles and for contacting each article at generally opposite points along a peripheral edge thereof to impart rotation to each article in a selected direction and, at the same time, to propel that article in a forward or downstream direction; and a generally cylindrical article orientation tube rotatably mounted in a generally horizontal position proximate said spinner wheels for receiving each of the articles propelled downstream by said spinner wheels and for discharging them at a downstream end thereof in a generally vertical on-edge orientation.

2. An apparatus as in claim 1, further comprising a plurality of generally horizontal, rotating spin bars positioned proximate the downstream end of said article orientation tube for receiving each of the articles discharged therefrom and for collecting them in a horizontal stack of articles, each having the same on-edge orientation.

3. An apparatus as in claim 1, further comprising an additional article orientation tube rotatably mounted in axial alignment with and at a downstream end of said article orientation tube.

4. An apparatus as in claim 3, wherein said additional article orientation tube is mounted a specified distance downstream from said article orientation tube to provide a gap therebetween.

5. An apparatus as in claim 4, further comprising one or more air jets fixedly positioned proximate said gap, said one or more air jets being coupled to an external source of compressed air and arranged to direct compressed air through said gap into said additional article orientation tube.

6. An apparatus as in claim 1, further comprising an article orientation sensor mounted proximate said conveying device for sensing the initial orientation of each of said circular articles prior to being received by said spinner wheels.

7. An apparatus as in claim 2, further comprising:

a counting sensor mounted proximate said conveying device for counting said circular articles received by said spinner wheels;

a counter stop mounted proximate said conveying device for momentarily interrupting the conveyance of said circular articles when a specified number thereof have been counted by said counting sensor; and a stack divider mounted for horizontal motion along said spin bars for providing a space between a last article required to form a collection of said specified number of said circular articles on said spin bars and a first article of a subsequent collection of said circular articles to be collected on said spin bars.

8. An apparatus as in claim 1, wherein an inner surface of said article orientation tube comprises a material having a specified coefficient of friction.

9. An apparatus as in claim 1, wherein an inner surface of said article orientation tube is tapered toward said downstream end thereof.

10. An apparatus as in claim 3, wherein an inner surface of said additional article orientation tube comprises a material having a specified coefficient of friction.

11. An apparatus as in claim 3, wherein an inner surface of said article orientation tube is tapered toward a downstream end thereof.

12. An apparatus as in claim 1, wherein a surface of each of said spinner wheels contacting each of said circular articles is generally concave in shape.

13. An apparatus as in claim 1, wherein said conveying device comprises a conveyor belt.

14. An apparatus as in claim 13, further comprising:

an air box over which said conveyor belt travels, said air box being adapted for coupling to an external source of vacuum;

and wherein:

said conveyor belt includes a plurality of generally longitudinally aligned openings therein, said openings providing vacuum communication between said air box and each of said articles on said conveyor belt to insure that they are conveyed downstream at a speed that is the same as a speed of said conveyor belt.

15. An apparatus as in claim 1, wherein each of said pair of spinner wheels is selectively reversibly rotatable.

16. An apparatus as in claim 1, wherein each of said pair of spinner wheels is rotatably reversibly driven at different speeds to produce a differential speed of rotation operative for imparting rotation to each of said articles in said selected direction and for propelling that article in said forward direction.

17. An apparatus as in claim 2, further comprising a counting sensor mounted proximate said conveying device for counting said circular articles received by said spinner wheels.

18. An apparatus as in claim 1, further comprising a counting sensor mounted proximate said conveying device for counting said circular articles received by said spinner wheels.

19. An apparatus as in claim 18, further comprising a counter stop mounted proximate said conveying device for momentarily interrputing the conveyance of said circular articles when a specified number thereof have been counted by said counting sensor.

20. An apparatus as in claim 19, further comprising a collection device for collecting said specified number of circular articles discharged from said article orientation tube.

21. An apparatus for receiving and collecting a multiplicity of circular articles having a generally flat cross-section, such as discs, rings, and lids, the apparatus comprising:

a conveying device for sequentially conveying the multiplicity of circular articles, said multiplicity of circular articles being initially presented in a known horizontal orientation, either all right side up or all upside down;

a single spinner wheel, mounted for rotation proximate a downstream end of the conveying device, for sequentially receiving each of the multiplicity of circular articles and for contacting each article along a peripheral edge thereof to impart rotation to each article in a selected direction and, at the same time, to propel that article in a forward or downstream direction; and a generally cylindrical article orientation tube rotatably mounted in a generally horizontal position proximate said spinner wheels for receiving each of the articles propelled downstream by said spinner wheel and for discharging them at a downstream end thereof in a generally vertical on-edge orientation.

22. An apparatus as in claim 21, further comprising a counting sensor mounted proximate said conveying device for counting said circular articles received by said single spinner wheel.

23. An apparatus as in claim 22, further comprising a counter stop mounted proximate said conveying device for momentarily interrputing the conveyance of said circular articles when a specified number thereof have been counted by said counting sensor.

24. An apparatus as in claim 23, further comprising a collection device for collecting said specified number of circular articles discharged from said article orientation tube.

* * * * *